US005617397A

United States Patent [19]
Jones et al.

[11] Patent Number: 5,617,397
[45] Date of Patent: Apr. 1, 1997

[54] MOVABLE INTERNAL PLATFORM FOR A DISK DRIVE

[75] Inventors: David E. Jones, Layton; Michael R. Lyon, Roy; Richard F. Leavitt, Layton; Carl F. Nicklos, Ogden; Ralph L. Sonderegger, Farmington; Mark S. Thayne, West Point; Yiping Ma, Layton, all of Utah

[73] Assignee: Iomega Corporation, Roy, Utah

[21] Appl. No.: 398,576

[22] Filed: Mar. 3, 1995

Related U.S. Application Data

[63] Continuation-in-part of Ser. No. 324,808, Oct. 18, 1994, and Ser. No. 324,671, Oct. 18, 1994, abandoned.

[51] Int. Cl.6 .............. G11B 17/30; G11B 21/02; G11B 33/02
[52] U.S. Cl. .............. 369/772; 369/219; 369/220; 369/249
[58] Field of Search .................. 369/77.2, 219, 369/220, 223, 249; 360/97.01, 99.06, 99.12, 106, 105, 99.02

[56] References Cited

U.S. PATENT DOCUMENTS

| | | | |
|---|---|---|---|
| 4,400,748 | 8/1983 | Bauck et al. | 360/99 |
| 4,419,703 | 12/1983 | Gruczelak et al. | 360/97 |
| 4,445,157 | 4/1984 | Takahashi | 360/133 |
| 4,502,083 | 2/1985 | Bauck et al. | 360/99 |
| 4,535,374 | 8/1985 | Anderson et al. | 360/97.01 |
| 4,571,646 | 2/1986 | Bauck et al. | 360/99 |
| 4,581,669 | 4/1986 | Tsuji et al. | 360/97 |
| 4,656,542 | 4/1987 | Shibata | 360/97 |
| 4,683,506 | 7/1987 | Toldi et al. | 360/105 |
| 4,723,185 | 2/1988 | Maeda | 369/77.2 |
| 4,953,042 | 8/1990 | Yoshikawa | 360/96.5 |
| 4,965,685 | 10/1990 | Thompson et al. | 360/97.01 |
| 5,005,093 | 4/1991 | Inoue et al. | 369/77.2 |
| 5,204,793 | 4/1993 | Plonczak | 360/97.01 |
| 5,218,503 | 6/1993 | Martin | 360/133 |
| 5,262,918 | 11/1993 | Tannert | 360/133 |
| 5,317,464 | 5/1994 | Witt et al. | 360/99.08 |

FOREIGN PATENT DOCUMENTS

WO93/18507  3/1993  WIPO .

OTHER PUBLICATIONS

Godwin, J., "An Introduction to the Insite 325 FLOPTICAL® Disk Drive", Optical Data Storage Topical Meeting, SPIE vol. 1078 (1989). (No month).

*Primary Examiner*—Stuart S. Levy
*Assistant Examiner*—Adriana Giordana
*Attorney, Agent, or Firm*—Woodcock Washburn Kurtz Mackiewicz & Norris

[57] ABSTRACT

A movable platform is mounted on opposing guide rails within a disk drive. A head actuator and spindle motor are mounted on the movable platform. The platform moves on the guide rails from a forward position to a rearward position upon insertion of a disk cartridge into the disk drive. As the platform moves toward the rearward position, the elevation of the platform changes in order to bring the spindle motor into engagement with the hub of the disk cartridge. A latch member is pivotally mounted on one of the guide rails for latching the platform in its forward position when the disk drive is not in use.

20 Claims, 14 Drawing Sheets

MOVABLE INTERNAL PLATFORM FOR A DISK DRIVE

CROSS-REFERENCE TO RELATED APPLICATIONS

This is a continuation-in-part of Ser. No. 08/324,808, filed Oct. 18, 1994, entitled "Apparatus for Performing Multiple Functions in a Data Storage Device Using a Single Electro-Mechanical Device" and of Ser. No. 08/324,671, also filed Oct. 18, 1994, now abandoned entitled "Disk Cartridge and Data Storage Device for Receiving Same", both of which are incorporated herein by reference.

BACKGROUND

1. Field of the Invention

The present invention relates to a data storage device, or disk drive, for receiving a removable disk cartridge. More particularly, the present invention relates to a movable platform disposed in the data storage device and on which critical drive components are mounted to achieve close tolerances and simplify testing.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

Disk drives for receiving removable disk cartridges, including conventional 3.5" floppy disk drives, must have some mechanism for bringing the hub of a disk cartridge into engagement with the spindle motor of the disk drive and for maintaining tight tolerances between the cartridge hub, spindle motor and magnetic head actuator of the disk drive. In many conventional floppy disk drives, a floppy disk cartridge is guided vertically into engagement with the spindle motor of the drive which is rigidly mounted to a base plate in the disk drive. The head actuator is also mounted to the base plate. With this arrangement, it is difficult to ensure critical tolerances and spacing between the disk cartridge, the head actuator and the spindle motor.

In other disk drives, such as that described in U.S. Pat. Nos. 4,663,677 and 5,317,464, the head actuator is fixedly attached to a base plate within the disk drive, but the spindle motor is mounted in a translating mechanism that translates the spindle motor vertically into engagement with the hub of a disk cartridge after the cartridge is fully inserted in the drive, while these mechanisms have their advantages, they are mechanically complex. Moreover, the movement of the spindle motor in relation to the head actuator makes it difficult to achieve critical tolerances between the disk cartridge, spindle motor and head actuator.

As the foregoing illustrates, there is a need for an improved apparatus for bringing a disk cartridge into engagement with the spindle motor of a disk drive and for accurately positioning a disk cartridge relative to the spindle motor and magnetic head actuator of a disk drive. Additionally, it would be advantageous if the improved mechanism could be assembled as a stand-alone, fully testable sub-assembly. The present invention satisfies these needs.

SUMMARY OF THE INVENTION

The present invention is directed to apparatus for use in a data storage device, or disk drive, of the type that receives a removable disk cartridge. According to the present invention, the apparatus comprises a pair of opposing guide rails and a platform movably mounted on the guide rails. The guide rails have opposing slots formed therein that guide a disk cartridge into the disk drive and that bring the disk cartridge into engagement with a cartridge receiving stop on the platform. Once the cartridge reaches the cartridge receiving stop, continued insertion of the cartridge into the disk drive pushes the platform from a first, or forward, position to a second, or rearward, position.

Further in accordance with the present invention, an actuator, which in the preferred embodiment comprises a linear actuator, is mounted on the platform. The actuator carries a head for recording and reading information to and from a recording medium within the disk cartridge. A spindle motor is also mounted on the platform for rotating the recording medium. Means for mounting the actuator and spindle motor are molded with the platform. A retaining cover is used to secure these components. By mounting these components on the platform, critical tolerances between the spindle motor, actuator and disk cartridge can be achieved. Additionally, the platform provides a fully testable sub-assembly during manufacturing of the disk drive.

The platform has a plurality of pins formed thereon, and the guide rails have corresponding cam slots that receive the pins. The pins follow the cam slots as the platform moves between its forward and rearward positions. In accordance with the present invention, the platform rises as it moves from its forward position to its rearward position in order to bring the spindle motor into engagement with the hub of the disk cartridge.

Preferably, a cartridge shutter lever is pivotally mounted on the platform tot engaging a shutter on the disk cartridge and for moving the shutter to expose a head access opening in the disk cartridge as the disk cartridge is inserted into the disk drive. A plurality of clips are integrally formed on the platform for routing electrical wiring along a surface of the platform.

According to a preferred embodiment, a latch member is pivotally mounted on one of the guide rails for latching the platform in place in its forward position when no cartridge is inserted in the disk drive. The latch member has a first projection that extends into the cartridge guide slot on the guide rail. A second projection on the latch member extends into one of the cam slots on the guide rail so that it blocks the corresponding pin on the platform from moving along the cam slot, thereby locking the platform in place. A disk cartridge inserted into the disk drive will engage the first projection and cause the latch member to pivot such that the second projection moves out of the cam slot, thereby releasing the platform. Preferably, the latch member is biased toward the latched position and is self-latching.

The foregoing and other objects, features and advantages of the invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE PREFERRED EMBODIMENTS

Figure 1:
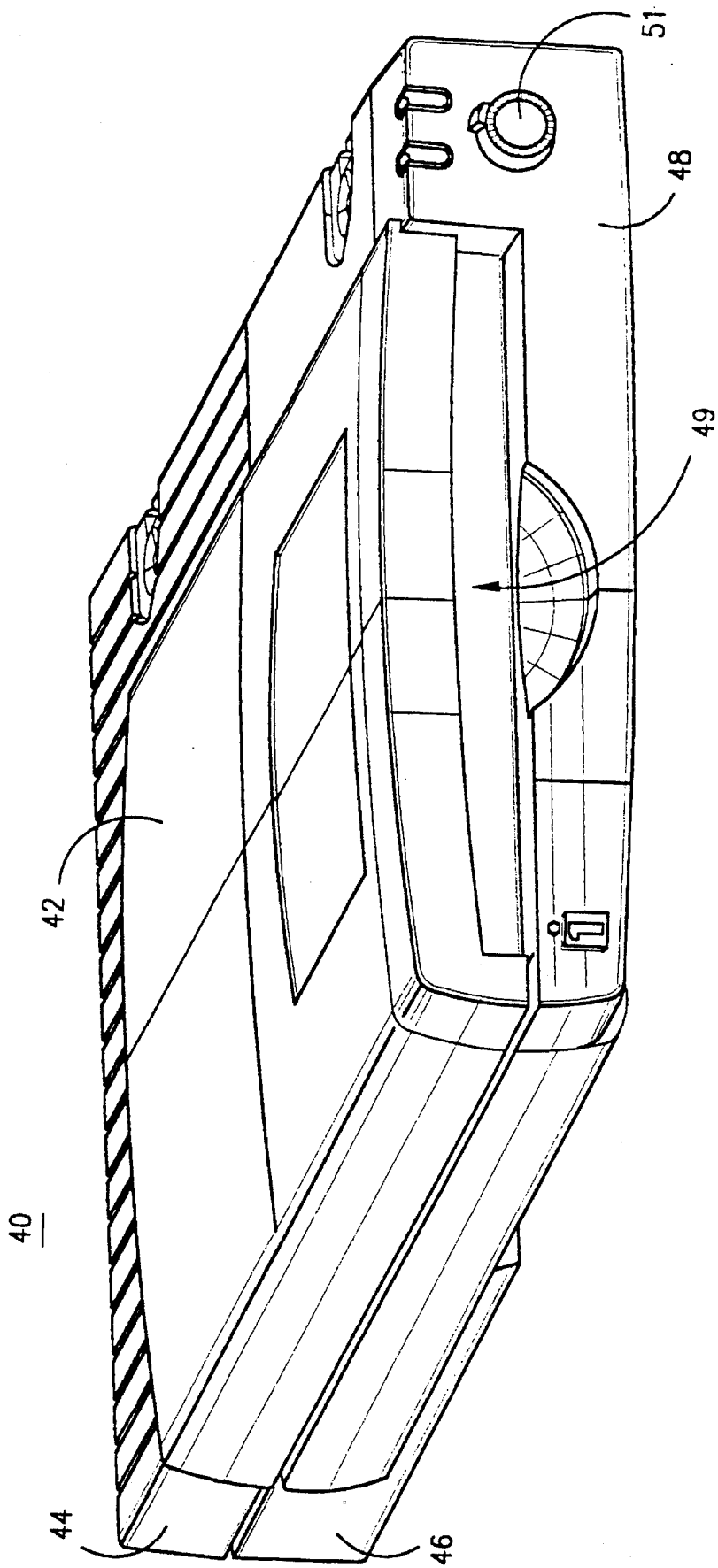
FIG. 1 is a perspective view of a data storage device, or disk drive, in which the present invention is embodied.

Referring to the drawings wherein like numerals indicate like elements throughout, there is shown in FIG. 1 a data storage device, or disk drive 40, in which the present invention is embodied. As shown, the disk drive 40 comprises an outer housing 42 having top and bottom covers 44, 46 and a front panel 48. A disk cartridge can be inserted into the disk drive 40 through a horizontal opening 49 in the front panel 48 of the disk drive 40. An eject button 51 is also provided on the front panel for automatically ejecting a disk cartridge from the disk drive 40. The disk drive 40 can be employed as a stand-alone unit, or alternatively, can be employed as an internal disk drive of a computer (not shown).

Figure 2:
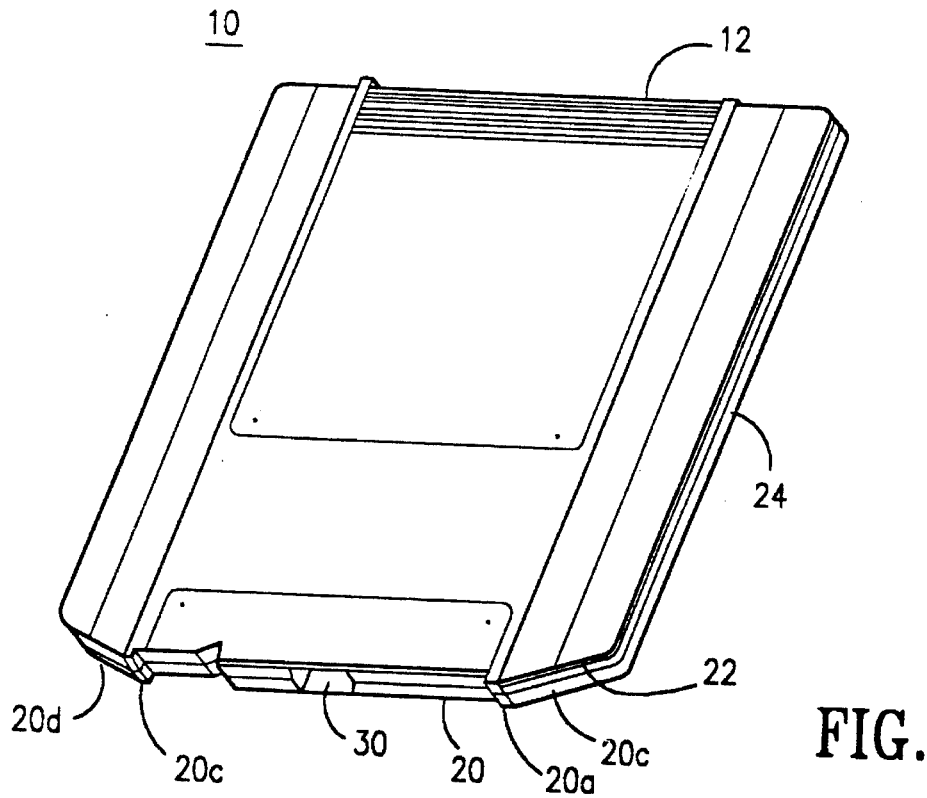
FIG. 2 is a perspective view of a disk cartridge for use with the disk drive of the FIG. 1.
Figure 3:
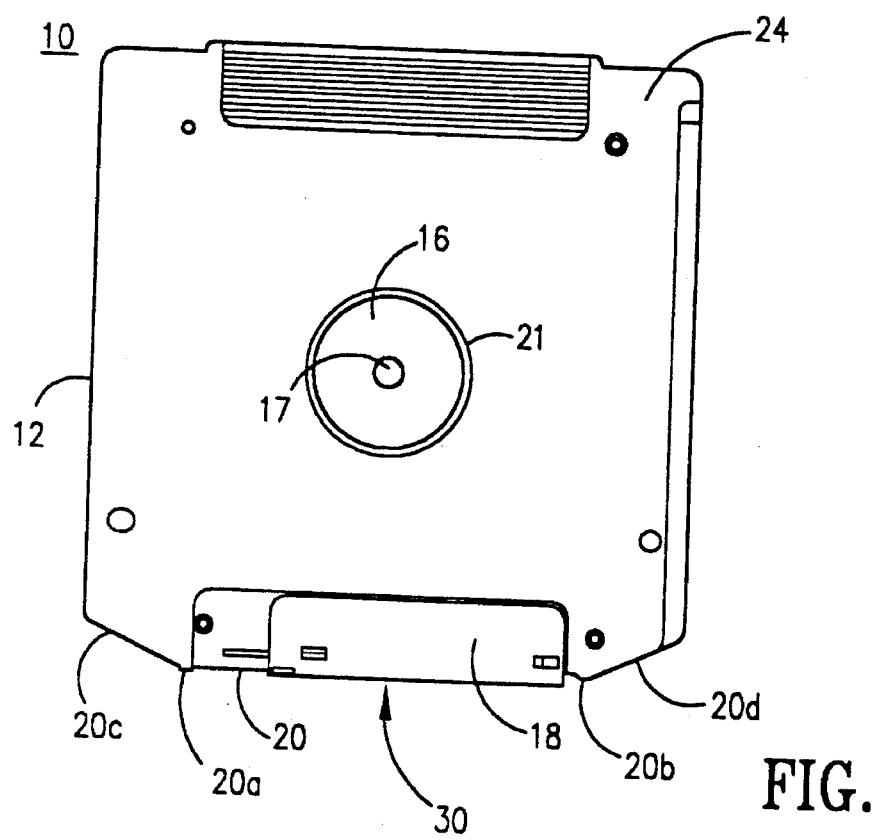
FIG. 3 is a bottom view of the disk cartridge of FIG. 2.

FIGS. 2 and 3 show an exemplary disk cartridge 10 adapted for use in the disk drive 40 of FIG. 1. As shown, the disk cartridge 10 comprises an outer casing 12 having upper and lower shells 22, 24 that mate to form the casing. A disk-shaped recording medium (not shown) is affixed to a hub 16 that is rotatably mounted in the casing 12. An opening 21 on the bottom shell 24 of the casing 12 provides access to the disk hub 16. A head access opening 30 in the front peripheral edge 20 of the disk cartridge 10 provides access to the recording surfaces of the disk by the recording heads of the disk drive. A shutter 18 (not shown in FIG. 2) is provided on the front peripheral edge 20 of the disk cartridge 10 to cover the head access opening 30 when the cartridge is not in use. When the cartridge is inserted into the disk drive, the shutter 18 moves to the side exposing the head access opening 30 and thereby providing the heads of the drive with access to the recording surface of the disk. In the present embodiment, the casing houses a flexible or floppy magnetic disk, however, in other embodiments, the disk may comprise a rigid magnetic disk, a magneto-optical disk or an optical storage medium.

The opposite front corners of the disk cartridge 10 have a non-square shape defined by angled surfaces 20c, 20d that angle away from the front peripheral edge 20 of the cartridge at a predetermined angle. Additionally, a pair of projections 20a, 20b are formed on the front peripheral edge 20 of the cartridge. Each projection 20a, 20b is formed adjacent a respective one of the angled surfaces 20c, 20d at the point where the respective surface 20c, 20d begins to angle away from the plane of the front peripheral edge 20 of the cartridge 10.

Figure 4:
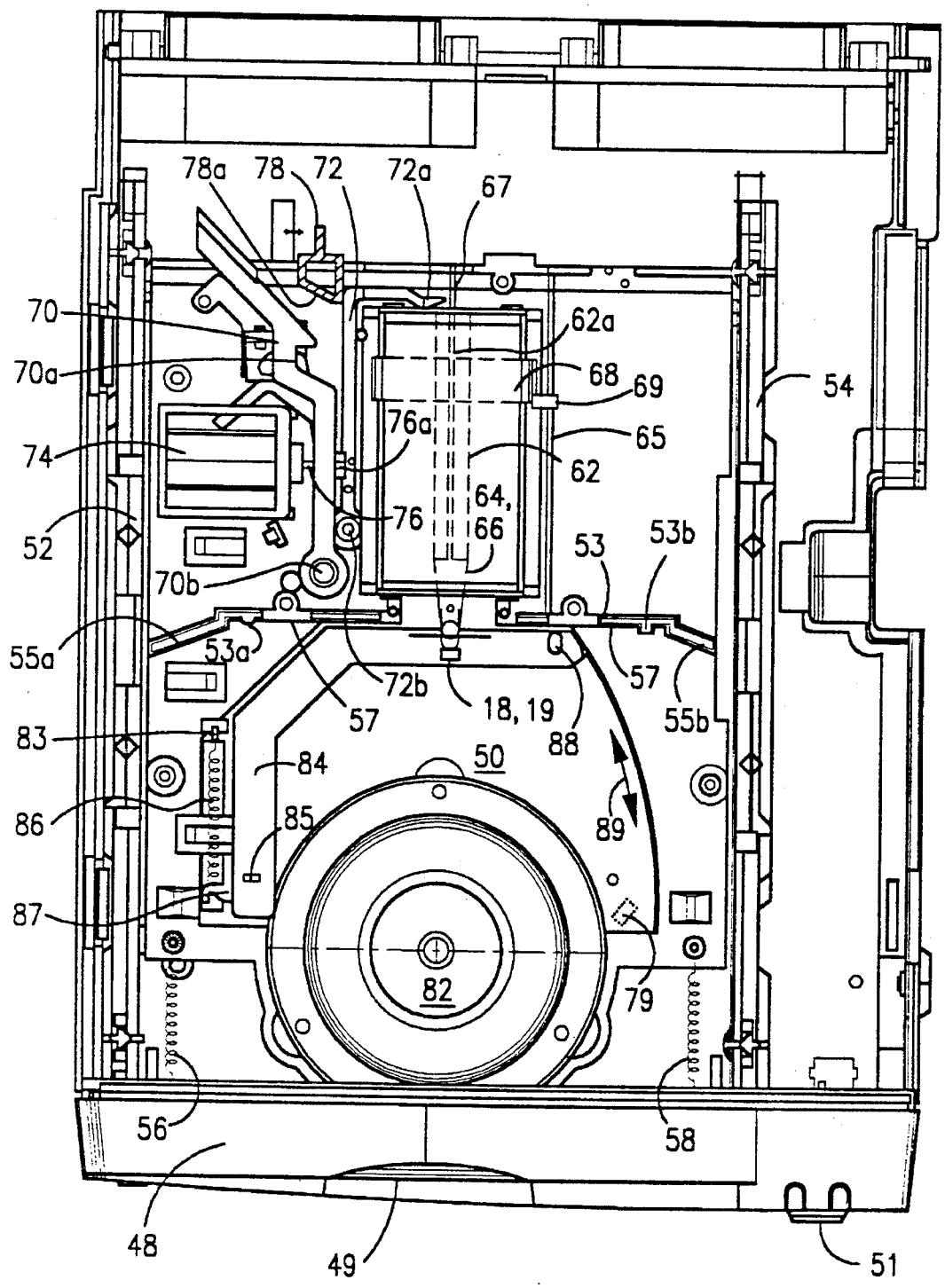
FIG. 4 is a top view of the disk drive of FIG. 1 with a top cover of the device housing removed, illustrating an embodiment of the present invention.
Figure 6:
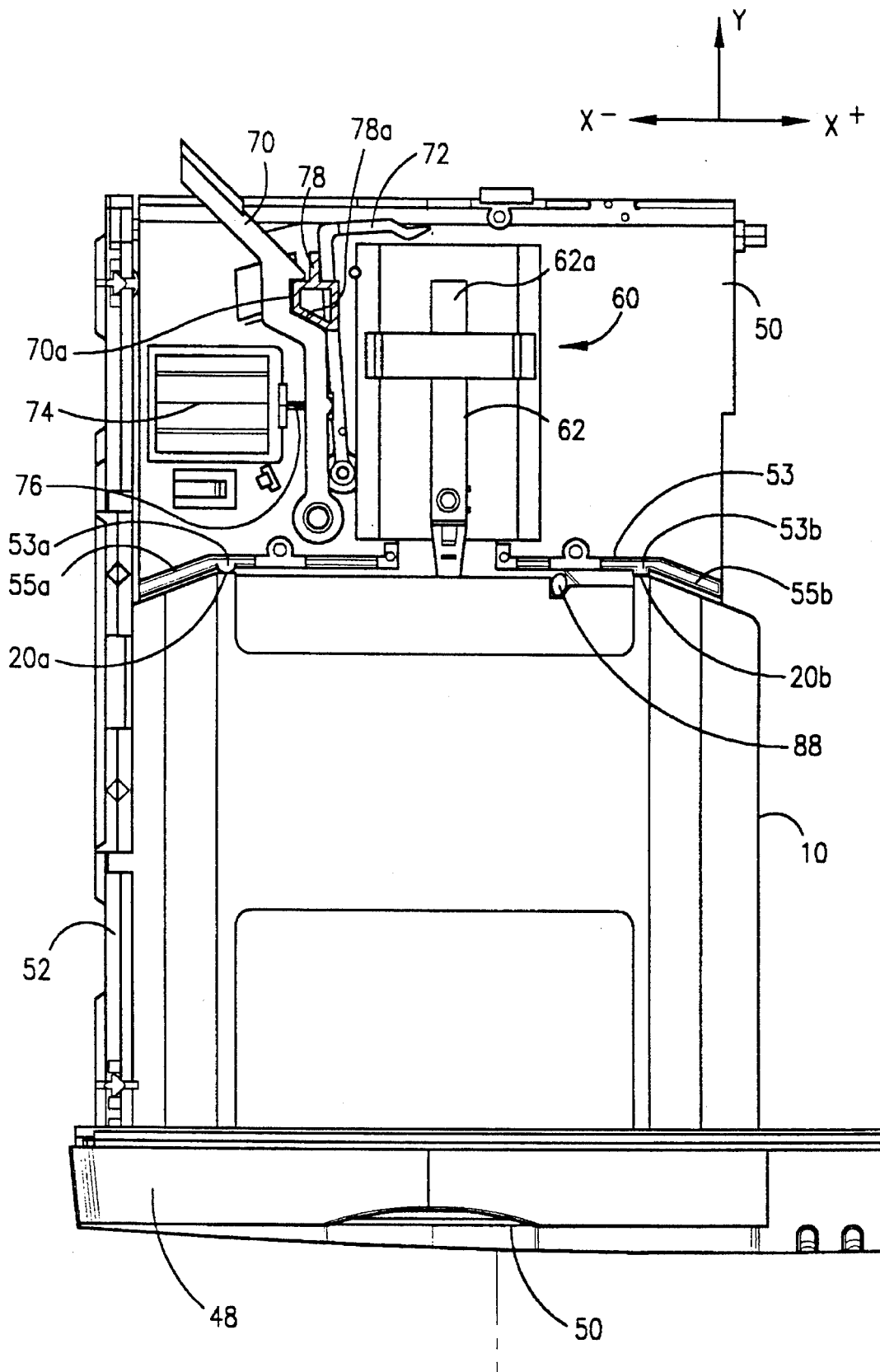

FIG. 4 is a top view of the disk drive 40 of FIG. 1 with the top cover 44 removed. The disk drive 40 comprises an internal platform 50 that, according to one aspect of the present invention, slides along opposing side rails 52, 54 between a first, or forward, position (FIG. 4) and a second, or rearward, position (FIG. 6). A pair of springs 56, 58 bias the platform 50 toward its forward position.

Further in accordance with the present invention, an actuator assembly 60, which in the preferred embodiment comprises a linear actuator, is mounted on the rear of the platform 50. The linear actuator 60 comprises a carriage 62 having two lightweight flexible arms 64, 66. The carriage travels on a central guide track, which in the present embodiment, is a cylindrical rod 67. An outrigger member 69 rides along a second cylindrical rod 65 (i.e., outrigger rod) to provide additional stability. The recording heads 18, 19 of the disk drive are mounted at the ends of the respective arms 64, 66. A coil 68, which is part of a voice coil motor, is mounted at the opposite end of the carriage 62. The coil 68 interacts with magnets to move the carriage linearly so that the heads 18 and 19 can move radially over respective recording surfaces of a disk cartridge inserted into the disk drive. Additional details of the linear actuator 60 are provided in co-pending application Ser. No. 08/324,599, filed Oct. 18, 1994, entitled "Actuator for Data Storage Device", which is incorporated herein by reference.

According to the present invention, a raised wall 53 is formed on the platform. The raised wall 53 extends across the width of the platform 50, perpendicularly to the direction of motion of the carriage 62. The raised wall 53 defines a cartridge receiving stop that engages the front peripheral edge 20 of the disk cartridge 10 upon insertion of the disk cartridge into the disk drive. The opposite side edges 55a, 55b of the cartridge receiving stop 53 are angled in the same manner as the opposite front corners 20c, 20d of the disk cartridge 10. Thus, the shape of the cartridge receiving stop 53 mirrors the contour of the forward end face of the cartridge. As further shown, the front surface of the cartridge receiving stop 53 has a pair of projections 53a, 53b positioned near the angled surfaces 55a, 55b. The projections 53a, 53b serve as critical datum features for precisely positioning the cartridge 10 on the platform 50.

Further according to the present invention, a spindle motor 82 is mounted on the platform 50. The spindle motor 82 is adapted to engage the hub of a disk cartridge inserted into the disk drive 40 and to rotate the recording medium of the disk cartridge at a predetermined operating speed. As described hereinafter, when a disk cartridge is inserted into the disk drive, the hub 16 of the disk cartridge engages the spindle motor 82 of the disk drive 40 as the platform 50 reaches its rearward position.

Still further in accordance with the present invention, a cartridge shutter lever 84 is pivotally mounted on the platform 50 at pivot point 85. The cartridge shutter lever 84 has an upstanding projection 88 formed at its distal end. A spring 86 is attached at one end to a hook 87 on the cartridge shutter lever 84 and at the other end to a hook 83 formed on the platform 50. The spring biases the shutter lever 84 toward the insertion opening 49 in the front panel 48 of the disk drive.

When no cartridge is inserted in the disk drive 40, the spring 86 will pull on the hook 87 of the shutter lever 84 causing the distal end of the shutter lever 84 to swing toward the front panel 48 of the disk drive until the upstanding projection 88 reaches the position indicated in dashed lines at 79. As a cartridge (e.g. cartridge 10 of FIGS. 2 and 3) is inserted into the disk drive, the upstanding projection 88 will engage an edge of the shutter 18 on the front of the cartridge 10. As the cartridge 10 is pushed further into the disk drive, the shutter lever 84 will swing with the cartridge toward the rear of the disk drive along the path indicated by arrow 89. As the shutter lever 84 swings to the rear, the upstanding projection 88 will push the cartridge shutter 18 to the side, thereby exposing the head access opening 18 in the front peripheral edge 20 of the cartridge 10. The shutter lever 88 completes its rearward movement as the cartridge 10 reaches the cartridge receiving stop 53 on the platform 50. At this point, the shutter lever 88 will be in the position shown in FIG. 4. When the cartridge 10 is removed, the shutter lever 88 will again swing forward to the position indicated at 79.

An eject latch lever 70 is pivotally mounted on the platform 50 about a rotation shaft 70b. As described hereinafter, the eject latch lever 70 functions to releasably latch the platform 50 in its rearward position. A spring (not shown) is coupled to the eject latch lever 70 at the rotation shaft 70b in order to bias the lever 70 in a clockwise direction as viewed in FIG. 4. The eject latch lever 70 has a cutout 70a adapted to releasably engage a latch projection 78 as the platform 50 moves backward into its rearward position (see FIG. 6). In the present embodiment, the latch projection 78 is formed as part of the top cover 44 (not shown) of the disk drive 40.

A head locking lever 72 is pivotally mounted on the platform 50 about a rotation shaft 72b. The head locking lever 72 functions to lock and unlock the carriage 62 of the linear actuator 60. A second spring (not shown) is coupled to the head locking lever 72 at its rotation shaft 72b to bias the head locking lever 72 in the same direction as the eject latch lever 70. An end 72a of the head locking lever, which extends at a right angle to the main shaft of the lever 72, is adapted to releasably engage an end 62a of the actuator carriage 62 when the carriage 62 is in a fully retracted position, thereby locking the carriage in place and preventing inadvertent movement of the recording heads 18, 19.

A single solenoid 74 is mounted on the platform 50 and has a drive shaft 76. When the solenoid 74 is energized by an electrical current, the drive shaft 76 moves from a normally extended position toward a retracted position. As the drive shaft 76 of the solenoid 74 moves toward its retracted position, an enlarged operating end 76a of the drive shaft 76 engages the eject latch and head locking levers 70, 72 in order to pull the levers against the biasing forces of their respective springs. Additional details of the structure and operation of the solenoid 74 and the eject latch and head locking levers 70, 72 are provided in the aforementioned co-pending application Ser. No. 08/324,808.

Figure 5:
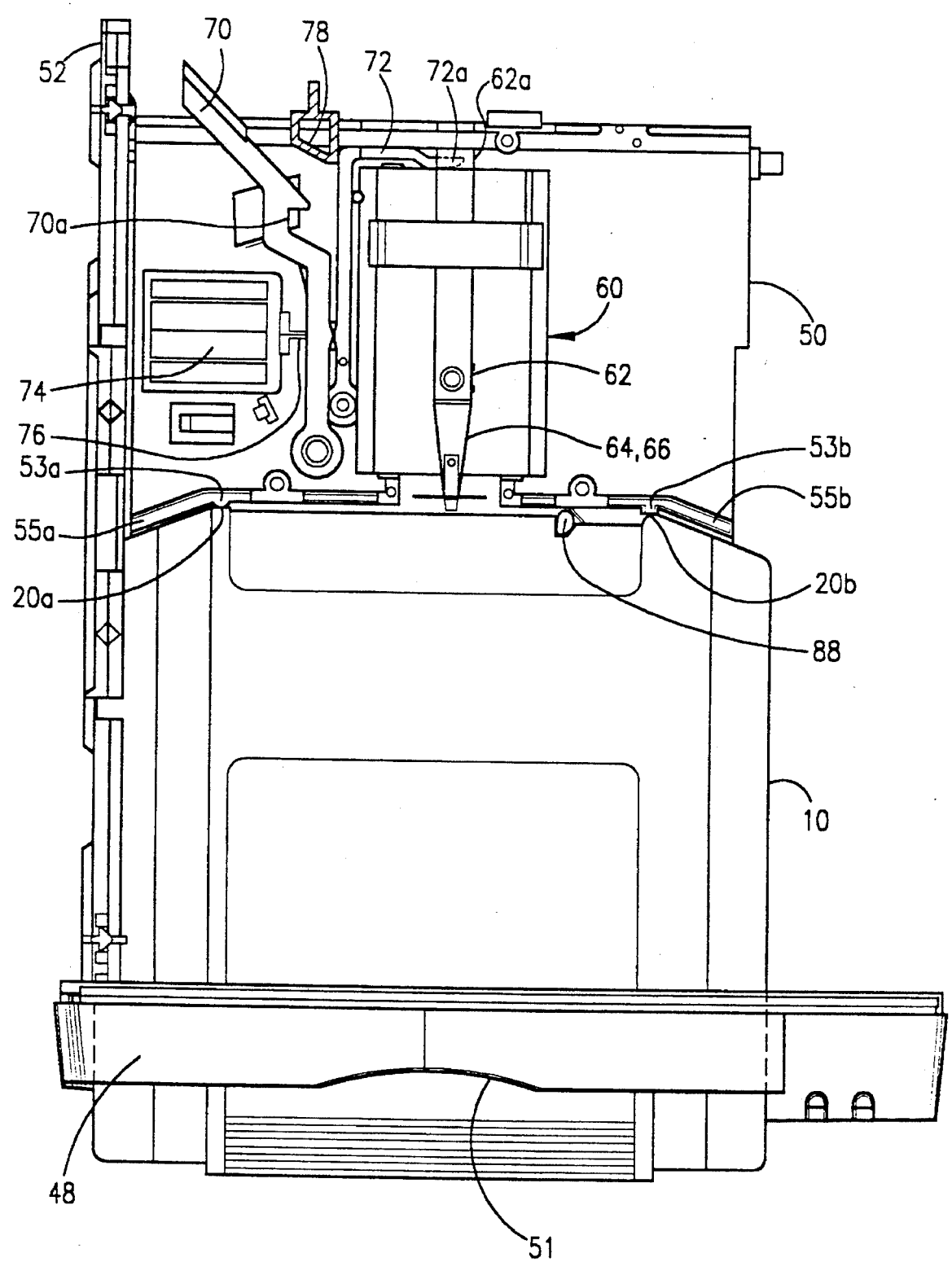
FIGS. 5 and 6 are top views of the disk drive of FIG. 4 illustrating the insertion of a disk cartridge into the disk drive.

FIGS. 5–6 illustrate the insertion of a disk cartridge 10 into the disk drive 40. For purposes of illustration only, some components of the disk drive 40 are not shown. Referring to FIG. 5, the platform 50 is initially in its forward position, as shown. A disk cartridge 10 is inserted into the disk drive 40 through the opening 49 in the front panel 48 of the disk drive 40. As the disk cartridge 10 begins to enter the disk drive 40, the platform 50 remains in its forward position, and the cartridge shutter lever 88 engages the cartridge shutter 18 and begins to move the cartridge shutter 18 to the side, as described above. The platform 50 will remain in the forward position until the front peripheral edge 20 of the cartridge 10 reaches the cartridge receiving stop 53 on the platform 50. Once the disk cartridge 10 contacts the cartridge receiving stop, continued insertion of the disk cartridge 10 will push the platform 50 back toward its rearward position.

As the platform 50 approaches its rearward position, the portion of the eject latch lever 70 just rearward of the cutout 70a contacts an angled surface 78a of the latch projection 78. As the disk cartridge 10 pushes the platform 50 farther to the rear of the disk drive, the eject latch lever 70 rides along the angled surface 78a pushing the eject latch lever 70 to the side against its normal spring bias. When the platform reaches its full rearward position, as shown in FIG. 6, the eject latch lever 70 springs back such that the cutout 70a engages the latch projection 78. This latches the platform 50 in its rearward position and maintains the disk cartridge 10 in the disk drive 40. In this manner, the eject latch lever 70 is said to be self-latching.

As described hereinafter in greater detail, and in accordance with the present invention, the platform 50 rides in cam slots (not shown) along the opposing side rails 52, 54. The cam slots (not shown) in the opposing side rails 52, 54 are contoured such that, as the platform 50 and disk cartridge 10 move rearwardly, the elevation of the platform 50 changes. Specifically, the platform 50 rises in order to bring the spindle motor 82 on the platform 50 into engagement with the hub 16 of the disk cartridge 10. The hub 16 and spindle motor 82 are fully engaged by the time the platform 50 is latched into its rearward position.

When it is desired to eject a disk cartridge from the disk drive, the eject button 51 on the front panel 48 of the disk drive 40 is pushed. A processor (not shown) in the disk drive detects the activation of the eject button and applies an electrical signal to the solenoid 74 causing the drive shaft 76 of the solenoid 74 to retract. As the drive shaft 76 retracts, the enlarged operating end 76a of the drive shaft pulls the eject latch lever 70 away from the stationary latch projection 78. As a result, the cutout 70a on the eject latch lever 70 disengages from the latch projection 78 releasing the platform 50. Once released, the platform 50 moves back to its forward position under the force of springs 56 and 58. As the platform 50 moves back to the forward position, the spindle motor 82 disengages from the hub 16 of the disk cartridge 10, and the disk cartridge 10 is backed out of the opening 49 for removal by a user.

Figure 7:
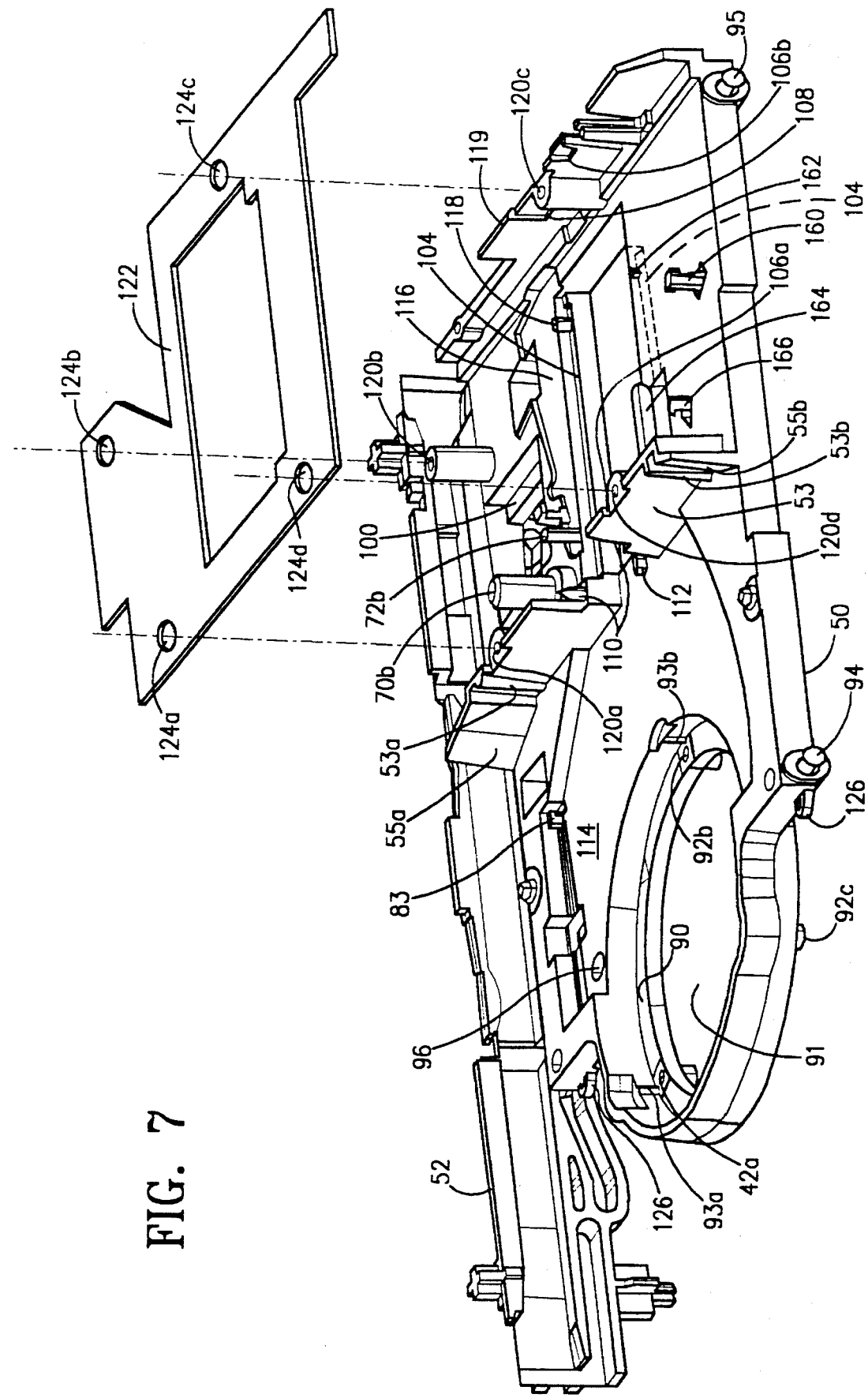
FIG. 7 is a perspective view showing the upper surface of a movable platform of the disk drive of FIG. 4 in accordance with a preferred embodiment of the present invention.

FIG. 7 is a perspective view of the upper side of the platform 50 and one of the guide rails 52 in accordance with a preferred embodiment of the present invention. The guide rail 52 is included for purposes of illustration. Preferably, the platform 50 is molded from a plastic material, such as, for example, polycarbonate. On each side of the platform 50 a forward pin 94 and a rearward pin 95 are formed (only the pins on one side are shown in FIG. 7). These pins ride in corresponding cam slots formed in the respective guide rails 52, 54, as described in greater detail hereinafter.

According to the present invention, the platform 50 is molded with critical datum features for mounting the actuator 60 and spindle motor 82. Features are also molded on the platform 50 for mounting the eject latch lever 70, head locking lever 72, solenoid 74, cartridge shutter lever 84 and a number of other components. Many of these components are secured on the platform 50 by a retaining cover 122. The retaining cover 122 is secured to the platform by four self-threading screws that are inserted through mounting holes 124a–d in the cover and then screwed into corresponding mounting holes 120a–d molded into the platform 50. Preferably, the cover 122 is also formed of plastic.

Recessed ledges 104 are formed at the rearward end of the platform 50 for mounting the actuator assembly 60 to the platform 50. The actuator assembly 60 rests snugly on these ledges and is secured by the retaining cover 122. A datum feature 108 is formed on a rear wall 119 of the platform 50 to provide critical positioning of the center rod 67 (FIG. 4) of the actuator assembly 60. A pair of opposing datum features 106a–b are formed on the back side of the cartridge receiving stop 53 and the rear wall 119 of the platform 50, respectively, to provide critical positioning of the outrigger rod 65 of the actuator assembly 60.

Additionally, a pair of projections 110 are formed on opposite sides of a central opening in the cartridge receiving stop 53 through which the flexible arms 64, 65 of the actuator 60 extend and retract during operation of the disk drive 40. A third projection 112 is formed on the recessed surface 114 of the platform 50. The projections 110, 112 serve as mounting provisions for a head load/unload ramp assembly (not shown) that guides the read/write heads 18, 19 at the end of the flexible arms 64, 66 during head loading and unloading operations. The head load/unload ramp assembly is secured by retaining cover 122. Details of the head load/unload ramp assembly are provided in co-pending application Ser. No. 08/324,895, filed Oct. 18, 1994, entitled "Head Load/Unload and Cleaning in a Data Storage Device", which is incorporated herein by reference.

A cylindrical opening 91 is formed at the forward end of the platform 50 for mounting the spindle motor 82 to the platform. The spindle motor 82 rests on a ledge 90 formed in the cylindrical opening. The spindle motor 82 is secured with three self-threading screws (not shown) that are screwed into mounting holes 92a–c formed in the recessed ledge 90 of the cylindrical opening 91. A raised datum, e.g., 93a, is formed on the inner wall of the cylindrical opening 91 proximate each of the three mounting holes 92a–c. Only two of the raised datum features, 93a and 93b, are visible in FIG. 7. These datum features ensure precise positioning of the spindle motor 82 on the platform 50.

A mounting hole 96 is formed in the platform 50 for mounting the cartridge shutter lever 84. As mentioned above, the biasing spring 86 of the cartridge shutter lever 84 (FIG. 4) is secured at one end to a hook 83 formed on the platform 50. The cartridge shutter lever 84 moves over a recessed surface 114 between the cylindrical opening 91 and the cartridge receiving stop 53, as described above.

A rotation shaft 70b is formed on the platform 50 for pivotally mounting the eject latch lever 70. Similarly, a second rotation shaft 72b is formed on the platform 50 for pivotally mounting the head locking lever 72. The head locking lever 72 moves over a recessed surface 116. A stop 118 formed on the recessed ledge 104 prevents the head locking lever 72 from contacting the actuator assembly 60. Another recessed ledge 100 is formed near one side of the platform 50 for mounting the solenoid 74 to the platform 50. The eject latch lever 70, head locking lever 74, and solenoid 74 are all retained by cover 122.

A rotation post 160, stop 162, guide 164 and spring hook 166 may also be formed on the platform 50 for mounting a head retraction mechanism to the platform. Such a head retraction mechanism is described in detail in co-pending application Ser. No. 08/398,656, filed concurrently herewith, entitled "Head Park Mechanism in a Data Storage Device for Preventing Accidental Damage" (Attorney Docket: IOM-8792), which is hereby incorporated by reference.

Figure 8:
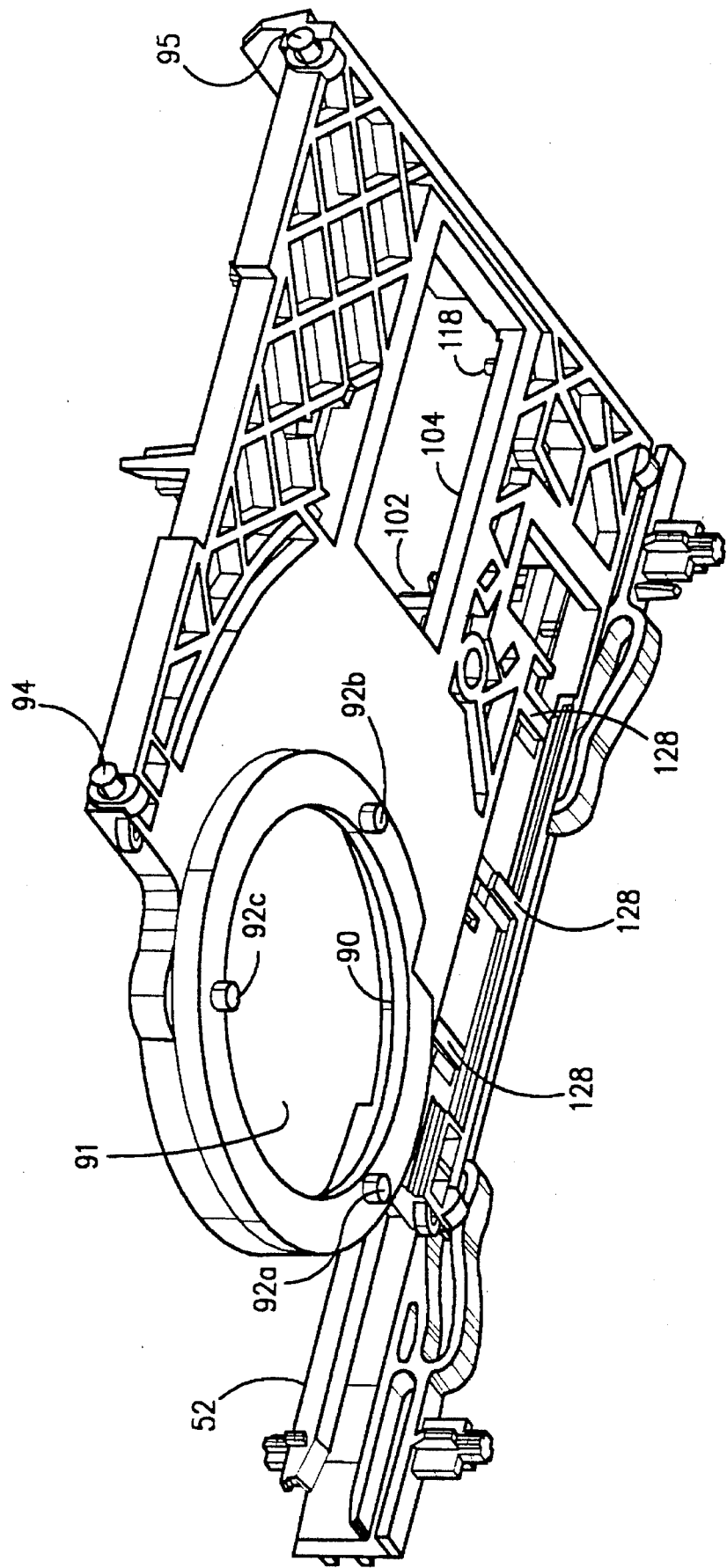
FIG. 8 is a perspective view showing the lower surface of the movable platform of FIG. 7.

FIG. 8 is a perspective view of the underside of the platform 50. As shown, a plurality of clips 128 are integrally formed on the underside of the platform 50. The clips 128 can be used to route wires (not shown) along the platform 50 to ensure that the wires do not interfere with the operation of the platform 50.

Figure 9:
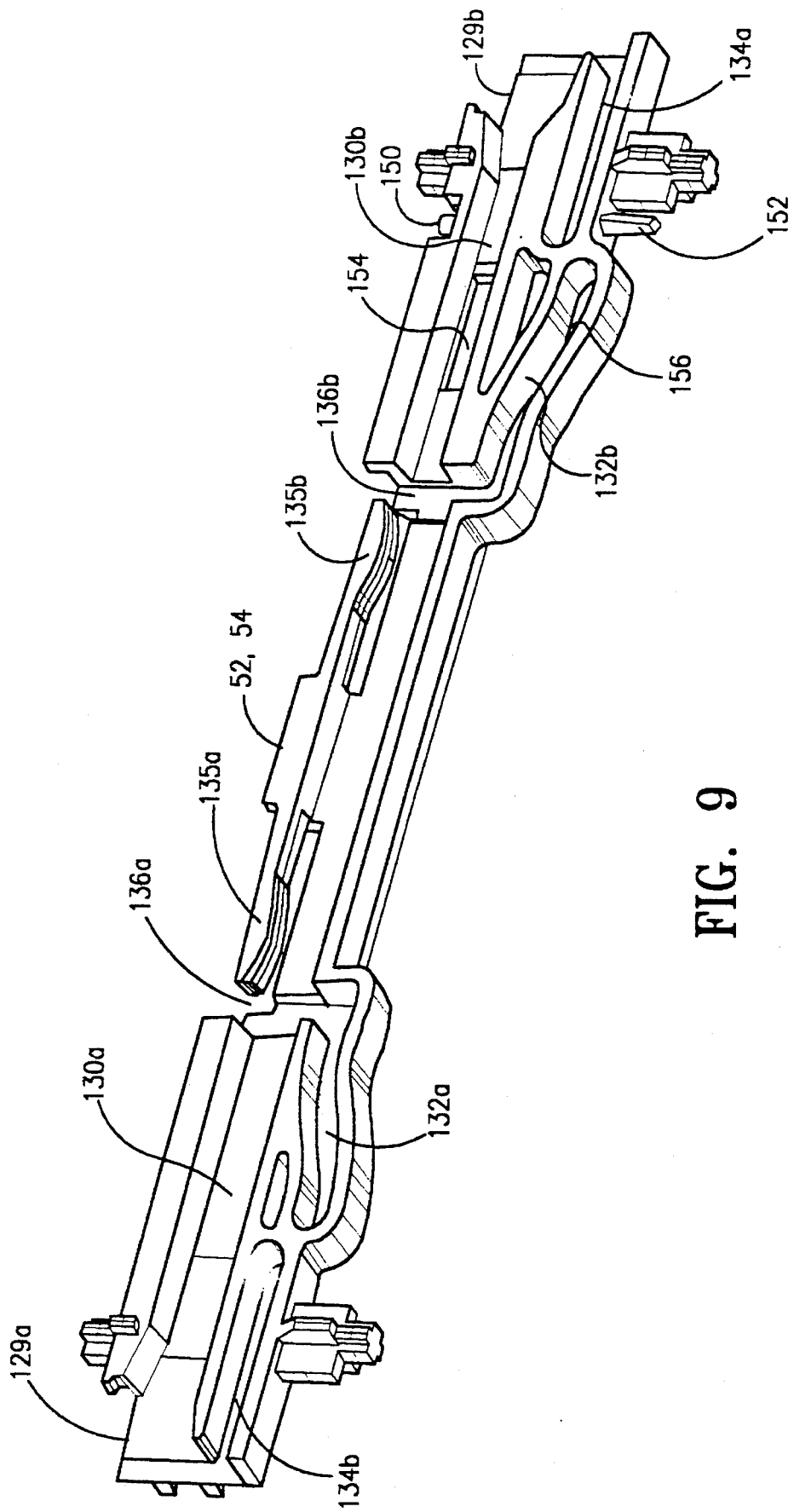
FIG. 9 is a perspective view of an interchangeable guide rail that can be used to implement both guide rails of FIG. 4.

FIG. 9 is a perspective view of the inside surface of an interchangeable guide rail that can be used to implement both the left and right guide rails 52, 54 of FIG. 4, in accordance with the present invention. A single, interchangeable guide rail simplifies manufacturing. As shown, the interchangeable guide rail has opposite ends 129a, 129b that are very similar. However, in accordance with a preferred embodiment, the end 129b is modified to incorporate a platform latch mechanism described hereinafter.

As shown in FIG. 9, the interchangeable guide rail has a plurality of cam slots 132a–b, 134a–b that receive the forward and rearward pins 94, 95 of the platform 50, respectively. Cartridge guide slots 130a, 130b are provided for guiding respective sides of a disk cartridge during insertion of the cartridge into the disk drive. Cantilevered beams 135a and 135b capture the respective sides of the disk cartridge and provide accurate vertical positioning of the cartridge. As used hereinafter, the terms "left" and "right" refer to the opposite sides of the disk drive 40, and respective components thereof, as viewed from FIG. 4.

When the interchangeable guide rail of FIG. 9 is used to implement the left guide rail 52, end 129a is positioned at the front (e.g., near front panel 48) of the disk drive, and end 129b extends to the rear of the disk drive. In this case, cam slot 132a receives the forward pin 94 on the left side of the platform 50, and cam slot 134a receives the rearward pin 95 on the left side of the platform 50. Cartridge guide slot 130a receives and guides the left side of a disk cartridge upon insertion into the disk drive. Cantilevered beam 135a captures the incoming left side of the cartridge 10 and ensures accurate vertical positioning of the cartridge.

When the interchangeable guide rail of FIG. 9 is used to implement the right guide rail 54, end 129b is positioned at the front (e.g., near front panel 48) of the disk drive, and end 129a extends to the rear of the disk drive. In this case, cam slot 132b receives the forward pin 94 on the right side of the platform 50, and cam slot 134b receives the rearward pin 95 on the right side of the platform 50. Cartridge guide slot 130b receives and guides the right side of the disk cartridge upon insertion into the disk drive. Cantilevered beam 135b captures the incoming right side of the cartridge 10 and ensures accurate vertical positioning thereof. Openings 136a and 136b on the top surface of the interchangeable guide rail facilitate simple, drop-in mounting of the forward platform pins 94 into their respective cam slots 132a–b.

As described hereinafter, in accordance with a preferred embodiment of the present invention, a latch member is provided on the right guide rail 54 to latch the platform 50 in its forward position (FIG. 4) when no cartridge is inserted in the drive. The end 129b of the interchangeable guide rail of FIG. 9, which is positioned at the forward end of the disk drive 40 when used to implement the right guide rail 54, has a number of features designed to facilitate attachment and operation of the latch member. Specifically, first and second posts 150, 152 are formed on the top and bottom of the guide rail, respectively. A first opening 154 is formed in the guide slot 130b, and a second opening 156 is formed in the corresponding cam slot 132b. The purpose of these features is described hereinafter.

Figure 10A:
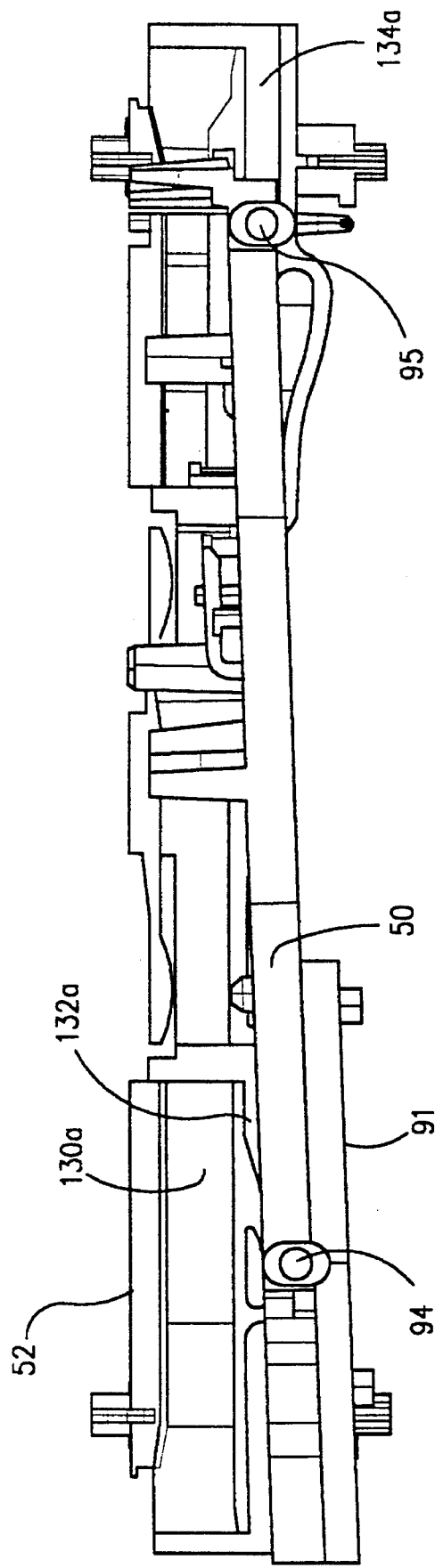
FIGS. 10A–10B illustrate the change in elevation of the movable platform of FIG. 7 as the platform moves from a first position to a second position in accordance with the present invention.
Figure 10B:
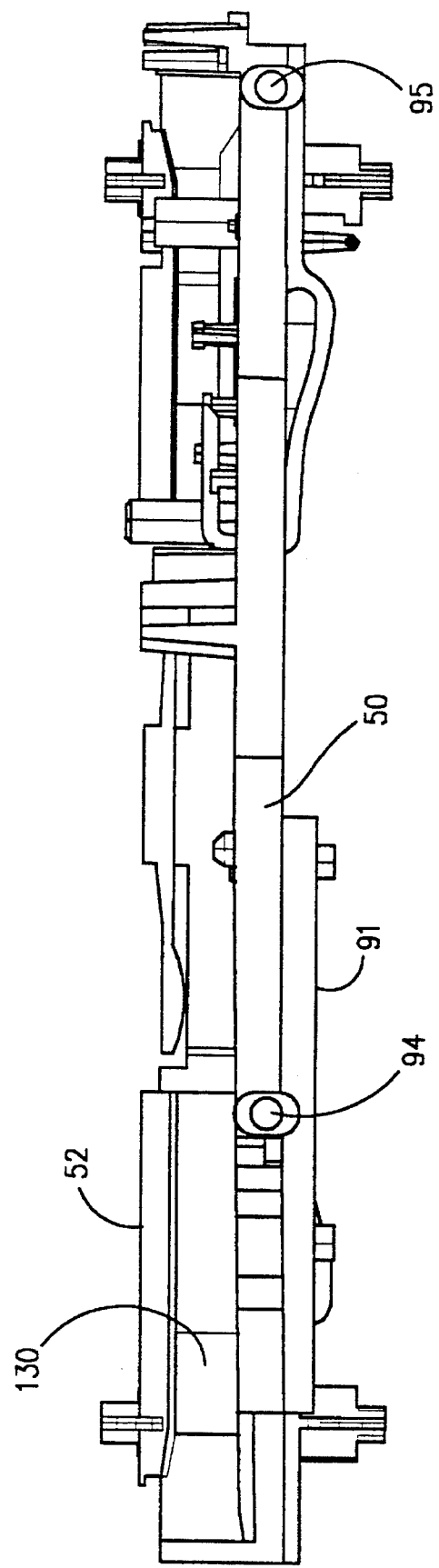

FIGS. 10A and 10B illustrate the rise in elevation that the platform 50 undergoes as it moves from its forward position to its rearward position along cam slots 132a–b and 134a–b. As shown in FIG. 10A, when the platform is in its forward position, the forward pins 94 on the left and right sides of the platform 50 rest in the lowest portions of the respective cam slots 132a–b. As a result, the forward end of the platform 50, to which the spindle motor 82 is attached, is tilted downwardly. A cartridge inserted along guide slots 130a–b will therefore not interfere with the spindle motor 82.

As shown in FIG. 10B, however, as the platform 50 is pushed toward its rearward position, the forward pins 94 on the left and right sides of the platform 50 ride up the surfaces of their respective cam slots 132a–b, resulting in a rise in elevation of the forward end of the platform 50. The rearward pins 95 of the platform 50 simply move straight along their respective cam slots 134a–b. The rise in elevation of the forward end of the platform 50 brings the spindle motor 82 into engagement with the hub 16 of the disk cartridge. As the platform 50 moves back to its forward position (FIG. 10A) upon ejection of the cartridge 10, the forward pins 94 of the platform 50 will ride back down their respective cam slots 132a–b causing the forward end of the platform to again tilt downwardly, thereby disengaging the spindle motor 82 from the hub 16 of the disk cartridge 10.

Figure 11:
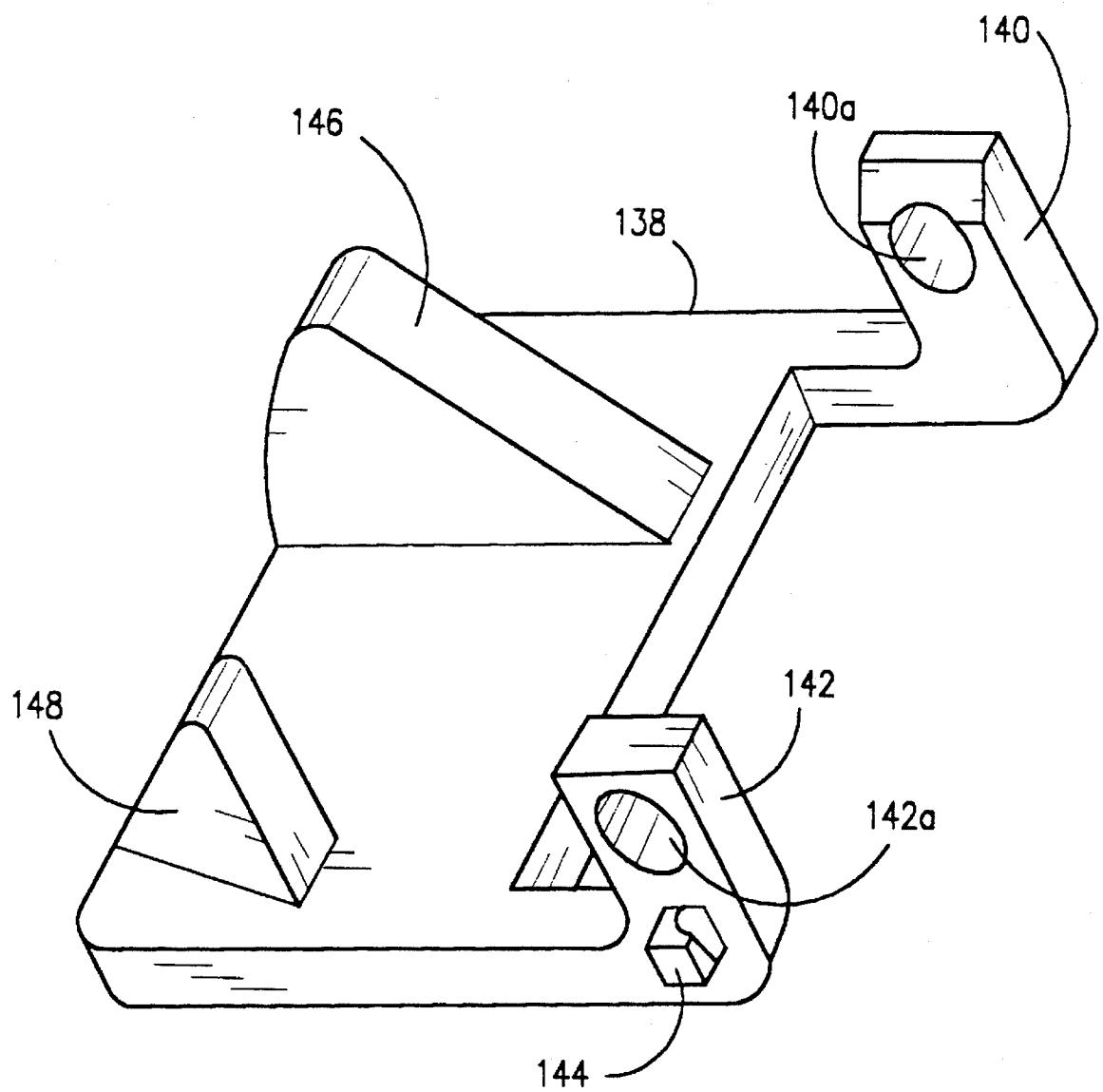
FIG. 11 is a perspective view of a latch member in accordance with another aspect of the present invention.

FIG. 11 is a perspective view of a latch member 138 in accordance with a preferred embodiment of the present invention. The latch member has a first projection 146 and a second projection 148. Each of the projections 146, 148 has ramped surfaces, as shown. The latch member 138 further includes first and second mounting prongs 140, 142 which have respective mounting holes 140a, 142a. A hook 144 is formed on the latch member 138 for attaching a spring (not shown).

Figure 12:
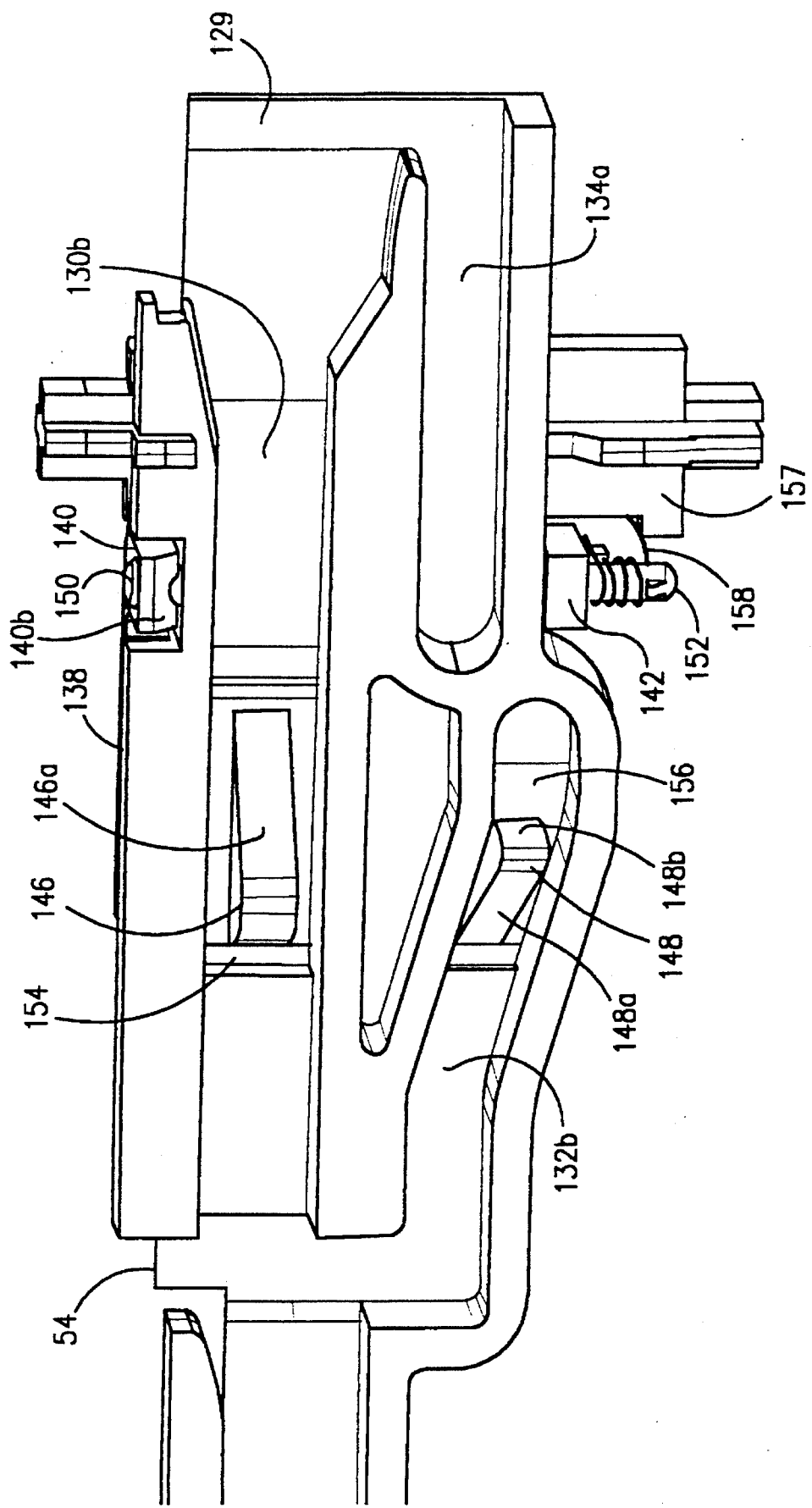
FIG. 12 show the attachment of the latch member of FIG. 11 to the guide rail of FIG. 10.

According to a preferred embodiment of the present invention, the latch member 138 is provided on the right guide rail 54 as shown in FIG. 12, although, in other embodiments, the latch member 138 may be incorporated on the left guide rail 52. As shown in FIG. 12, the latch member 138 is pivotally mounted on the forward end 129b of the right guide rail 54. Specifically, the mounting hole 142a in the lower mounting prong 142 of the latch member 138 is fitted over the mounting post 152 on the bottom of the guide rail. The mounting hole 140a in the upper mounting prong 140 of the latch member 138 is then snap-fit onto the upper mounting post 150 of the guide rail. The upper mounting prong 140 has an angled surface 140b to facilitate the snap-fitting operation. A spring 158 is then coupled between the hook 144 on the latch member 138 and a post 157 on the guide rail. The spring 158 biases the latch member 138 against the outer surface of the guide rail 54. In this position, the first projection 146 on the latch member 138 extends through the opening 154 in the cartridge guide slot 130b of the guide rail, and the second projection 148 on the latch member 138 extends through the opening 156 in the cam slot 132b of the guide rail 54.

When the platform 50 is in its forward position, and no cartridge is inserted into the drive, a locking surface 148b of the second projection 148 of the latch member 138 will block the forward pin 94 on the right side of the platform 50 and prevent the pin 94 from moving in the cam slot 132b. The platform 50 is therefore locked in its forward position.

Preferably, the second projection 148 is formed such that if the platform pin 94 presses against the locking surface 148b, the latch member 138 will lock even tighter against the guide rail 54. Additionally, the opposite surface 148a of the second projection 148 is preferably ramped so that, if the platform is moving from its rearward position to its forward position and no cartridge is inserted in the disk drive, the platform pin 94 will engage the ramped surface 148a of the second projection 148 and push it to the side. As the platform pin 94 moves fully into its forward position, the second projection 148 will spring back into the cam slot 132b, thereby locking the platform 50 in place. In this manner, the latch member 138 is self-latching.

Figure 13:
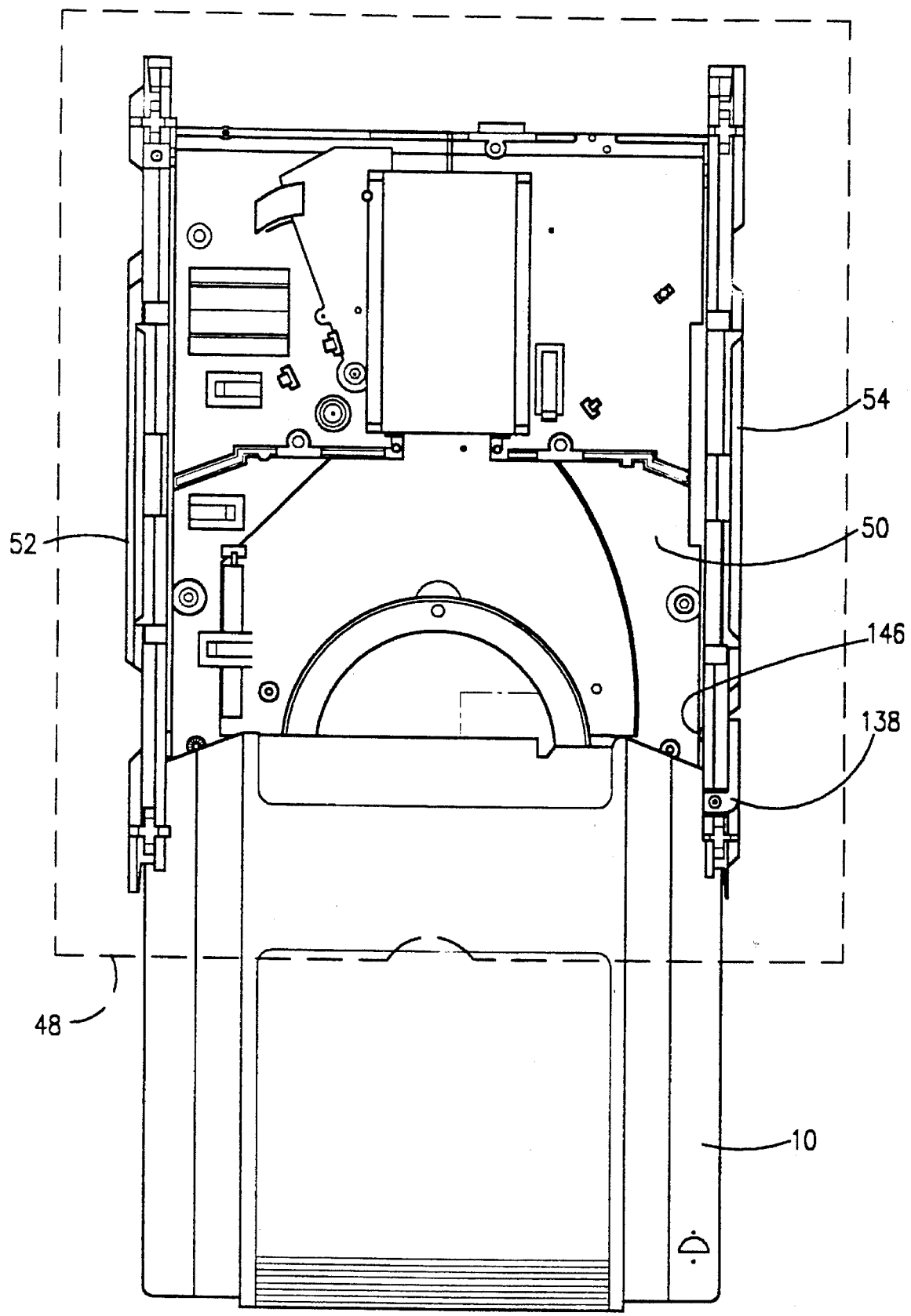
FIGS. 13 and 14 illustrate the operation of the latch member of FIG. 11.
Figure 14:
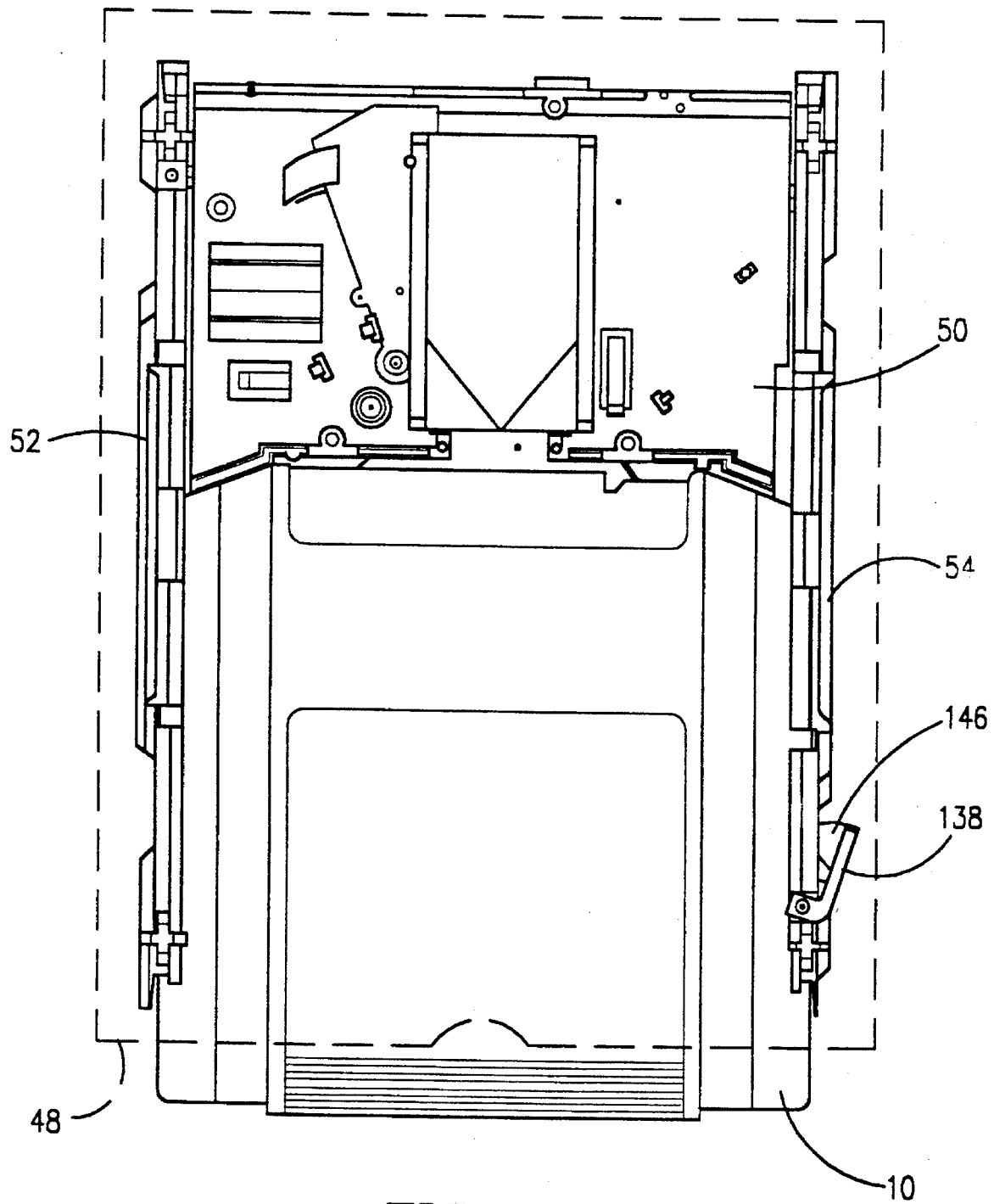

FIGS. 13 and 14 illustrate the operation of the latch member 138. As shown in FIG. 13, when a cartridge has just begun to be inserted into the disk drive, the platform 50 is in its forward position, and the latch member 138 is flush against the outside of the guide rail 54. The second projection 148 on the latch member 138 is therefore blocking the pin 94 on the right side of the platform 50. As shown in FIG. 14, however, as the cartridge is pushed further into the disk drive, the right side of the cartridge engages the first projection 146 on the latch member 138 causing the latch member to pivot away from the guide rail 54. This moves the second projection 148 out of the cam slot 132b, thereby releasing the platform 50 and allowing it to move into its rearward position. When the cartridge is removed, and the platform 50 moves back to its forward position, the latch member 138 will again lock the platform 50 in place.

As the foregoing illustrates, the present invention is directed to a movable internal platform for a disk drive. By mounting the actuator and spindle motor to the movable platform 50, critical tolerances between the spindle motor, actuator and a disk cartridge inserted into the disk drive can be achieved. Indeed, all critical vertical tolerances remain fixed relative to one another by virtue of the various components being mounted on the platform 50. Additionally, the platform 50 provides a complete sub-assembly that is fully, and easily, testable during manufacture. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. Apparatus for use in a data storage device of the type that receives a removable disk cartridge, said apparatus comprising:

a pair of guide rails opposed to each other and spaced at a predetermined interval;

a platform movably mounted on said guide rails and having a cartridge receiving stop, the disk cartridge engaging the cartridge receiving stop upon insertion of the disk cartridge into the data storage device and thereby pushing said platform along said guide rails from a forward position to a rearward position within the data storage device;

an actuator mounted on said platform, said actuator having a head mounted thereon for recording and reading information to and from a recording medium within the disk cartridge; and a spindle motor mounted on said platform for rotating the recording medium, wherein the elevation of said platform relative to a plane of said disk cartridge changes as the platform moves from said forward position to said rearward position, such that the spindle motor is brought into engagement with a hub of the disk cartridge.

2. The apparatus recited in claim 1 wherein said actuator comprises a linear actuator.

3. The apparatus recited in claim 1 further comprising a cartridge shutter lever pivotally mounted on the platform for engaging a shutter on the disk cartridge and for moving the shutter to expose a head access opening in the disk cartridge as the disk cartridge is inserted into the disk drive.

4. The apparatus recited in claim 1 wherein the platform has a plurality of clips integrally formed thereon for routing electrical wiring along a surface of the platform.

5. The apparatus recited in claim 1 wherein each of said guide rails has a slot formed therein, and wherein said slots oppose each other to form a channel for guiding the disk cartridge into the disk drive and for bringing the disk cartridge into engagement with the cartridge receiving stop on the platform.

6. The apparatus recited in claim 1 further comprising a latch member movably mounted on one of said guide rails, said latch member engaging the platform and locking the platform substantially in place on said guide rails in said forward position when a disk cartridge is not inserted in the disk drive, said latch member interacting with a disk cartridge upon insertion of the disk cartridge into the disk drive to release the platform from the forward position.

7. The apparatus recited in claim 1 wherein the platform has a plurality of pins formed thereon, and wherein the guide rails have a plurality of cam slots that correspond to said plurality of pins, each of said cam slots receiving one of said pins and said pins following said cam slots as the platform moves between said first and second positions.

8. The apparatus recited in claim 7 wherein each of said guide rails has a cartridge guide slot formed therein, said cartridge guide slots opposing each other to form a channel for guiding the disk cartridge into the disk drive and for bringing the disk cartridge into engagement with the cartridge receiving stop on the platform.

9. The apparatus recited in claim 8 further comprising a latch member pivotally mounted on one of said guide rails, the latch member having a first projection that extends into the cartridge guide slot on said one guide rail and a second projection that extends into one of said cam slots to block the platform pin received in said one cam slot from moving along said one cam slot when the platform is in said forward position and no cartridge is inserted in the disk drive, a disk cartridge inserted into the disk drive engaging said first projection and causing said latch member to pivot such that the second projection moves out of said one cam slot thereby releasing said platform.

10. The apparatus recited in claim 9 wherein said latch member is biased toward a position in which the second projection extends into said one cam slot and blocks said one pin of said platform.

11. The apparatus recited in claim 9 wherein said latch member is self-latching.

12. Apparatus for use in a data storage device of the type that receives a removable disk cartridge, said apparatus comprising:

a pair of guide rails opposed to each other and spaced at a predetermined interval;

a platform movably mounted on said guide rails and having a cartridge receiving stop, the disk cartridge engaging the cartridge receiving stop upon insertion of the disk cartridge into the data storage device and thereby pushing said platform along said guide rails from a forward position to a rearward position within the data storage device;

an actuator mounted on said platform, said actuator having a head mounted thereon for recording and reading information to and from a recording medium within the disk cartridge;

a spindle motor mounted on said platform for rotating the recording medium, wherein the elevation of said platform relative to a plane of said disk cartridge changes as the platform moves from said forward position to said rearward position, such that the spindle motor is brought into engagement with a hub of the disk cartridge; and a latch member movably mounted on one of said guide rails that engages the platform and locks the platform substantially in place on said guide rails in said forward position when a disk cartridge is not inserted in the data storage device, said latch mechanism interacting with a disk cartridge upon insertion of the disk cartridge into the disk drive to release the platform from the forward position.

13. The apparatus recited in claim 12 wherein said actuator comprises a linear actuator.

14. The apparatus recited in claim 12 further comprising a cartridge shutter lever pivotally mounted on the platform for engaging a shutter on the disk cartridge and for moving the shutter to expose a head access opening in the disk cartridge as the disk cartridge is inserted into the disk drive.

15. The apparatus recited in claim 12 wherein the platform has a plurality of clips integrally formed thereon for routing electrical wiring along a surface of the platform.

16. The apparatus recited in claim 12 wherein the platform has a plurality of pins formed thereon, and wherein the guide rails have a plurality of cam slots that correspond to said plurality of pins, each of said cam slots receiving one of said pins and said pins following said cam slots as the platform moves between said forward and rearward positions.

17. The apparatus recited in claim 16 wherein each of said guide rails has a cartridge guide slot formed therein, said cartridge guide slots opposing each other to form a channel for guiding the disk cartridge into the disk drive and for bringing the disk cartridge into engagement with the cartridge receiving stop on the platform so that further insertion of the cartridge will push the platform from the forward position to the rearward position.

18. The apparatus recited in claim 17 wherein said latch member is pivotally mounted on said one guide rail and comprises a first projection that extends into the cartridge guide slot on said one guide rail and a second projection that extends into one of said cam slots to block the platform pin received in said one cam slot from moving along said one cam slot when the platform is in said forward position and no cartridge is inserted in the disk drive, a disk cartridge inserted into the disk drive engaging said first projection and causing said latch member to pivot such that the second projection moves out of said one cam slot thereby releasing said platform.

19. The apparatus recited in claim 18 wherein said latch member is biased toward a position in which the second projection extends into said one cam slot and blocks said one pin of said platform.

20. The apparatus recited in claim 18 wherein said latch member is self-latching.

* * * * *